United States Patent
Frangioni (10) Patent No.: US 10,580,130 B2
(45) Date of Patent: Mar. 3, 2020

(54) TISSUE IDENTIFICATION BY AN IMAGING SYSTEM USING COLOR INFORMATION

(71) Applicant: Curadel, LLC, Malborough, MA (US)

(72) Inventor: John V. Frangioni, Worcester, MA (US)

(73) Assignee: Curadel, LLC, Marlborough, MA (US)

( * ) Notice: Subject to any disclaimer, the term of this patent is extended or adjusted under 35 U.S.C. 154(b) by 0 days.

(21) Appl. No.: 15/469,148

(22) Filed: Mar. 24, 2017

(65) Prior Publication Data

US 2018/0276814 A1 Sep. 27, 2018

(51) Int. Cl.
*G06T 7/00* (2017.01)
*G06T 11/60* (2006.01)

(52) U.S. Cl.
CPC ............ *G06T 7/0012* (2013.01); *G06T 11/60* (2013.01); *G06T 2207/10016* (2013.01); *G06T 2207/10064* (2013.01); *G06T 2207/20081* (2013.01); *G06T 2207/30024* (2013.01); *G06T 2207/30101* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 6,293,911 B1 * | 9/2001 | Imaizumi | A61B 1/00009 600/160 |
| 6,463,167 B1 | 10/2002 | Feldman et al. | |
| 6,658,080 B1 * | 12/2003 | Poole | A61B 5/7445 378/4 |
| 7,468,796 B2 * | 12/2008 | Luther | G01N 15/1468 356/411 |
| 7,826,650 B2 * | 11/2010 | Marcelpoil | G01N 15/1475 356/39 |
| 7,949,181 B2 | 5/2011 | Padfield et al. | |
| 8,107,698 B2 | 1/2012 | Kitamura | |
| 8,144,993 B2 | 3/2012 | Nishimura et al. | |
| 8,224,425 B2 | 7/2012 | Freeman et al. | |

(Continued)

FOREIGN PATENT DOCUMENTS

| | | |
|---|---|---|
| WO | WO-2016069788 A1 | 5/2016 |
| WO | WO-2016146469 A1 | 9/2016 |

(Continued)

OTHER PUBLICATIONS

Nichols, Brandon S., Narasimhan Rajaram, and James W. Tunnell. "Performance of a lookup table-based approach for measuring tissue optical properties with diffuse optical spectroscopy." Journal of biomedical optics 17.5 (2012): 057001. (Year: 2012).*

(Continued)

*Primary Examiner* — Samah A Beg
(74) *Attorney, Agent, or Firm* — Behmke Innovation Group LLC; James Behmke; Stephen D. LeBarron (57) ABSTRACT

In one embodiment, an imaging device determines color information for a portion of organic tissue from one or more captured color images of the tissue. The imaging device identifies one or more optical properties of the portion of tissue based on the determined color information. The imaging device adjusts fluorescence data captured via one or more fluorescence images of the portion of organic tissue. The imaging device provides the adjusted fluorescence data to an electronic display for display.

20 Claims, 8 Drawing Sheets

(56) References Cited

U.S. PATENT DOCUMENTS

| | | | |
|---|---|---|---|
| 8,442,289 B2 | 5/2013 | Kadomura et al. | |
| 8,472,682 B2 | 6/2013 | Guissin et al. | |
| 8,620,410 B2* | 12/2013 | Frangioni | A61B 1/0005 600/473 |
| 9,326,666 B2 | 5/2016 | Frangioni | |
| 9,955,865 B2* | 5/2018 | Charles | A61B 3/102 |
| 2001/0017938 A1* | 8/2001 | Kerschmann | G06T 5/50 382/133 |
| 2002/0186875 A1* | 12/2002 | Burmer | G06K 9/00127 382/133 |
| 2008/0024515 A1* | 1/2008 | Yang | G06T 15/06 345/592 |
| 2010/0081924 A1 | 4/2010 | Hyde et al. | |
| 2010/0130871 A1 | 5/2010 | Frykman et al. | |
| 2012/0200694 A1* | 8/2012 | Garsha | G01N 21/6456 348/79 |
| 2012/0314920 A1* | 12/2012 | Prigent | G06T 7/0012 382/128 |
| 2012/0328178 A1* | 12/2012 | Remiszewski | A61B 5/0071 382/133 |
| 2013/0179298 A1* | 7/2013 | Segman | G16H 20/10 705/26.7 |
| 2013/0322713 A1* | 12/2013 | Piechnik | A61B 5/055 382/128 |
| 2013/0338479 A1* | 12/2013 | Pogue | A61B 5/0059 600/408 |
| 2014/0128680 A1* | 5/2014 | Shida | A61B 1/043 600/178 |
| 2014/0307078 A1* | 10/2014 | Charles | A61B 3/102 348/78 |
| 2015/0062153 A1 | 3/2015 | Mihalca et al. | |
| 2015/0150460 A1* | 6/2015 | Krishnaswamy | A61B 1/07 600/408 |
| 2015/0339816 A1* | 11/2015 | Yu | G01N 33/576 382/128 |
| 2016/0015471 A1 | 1/2016 | Piron et al. | |
| 2016/0077007 A1 | 3/2016 | Demos et al. | |
| 2016/0239632 A1* | 8/2016 | Yu | G16H 50/50 |
| 2016/0290926 A1* | 10/2016 | Notingher | G01N 33/4833 |
| 2016/0343131 A1* | 11/2016 | Holt | G06T 7/0012 |
| 2017/0299482 A1* | 10/2017 | Gupta | G01N 1/30 |
| 2018/0108163 A1* | 4/2018 | Remiszewski | G06T 7/337 |

FOREIGN PATENT DOCUMENTS

| | | |
|---|---|---|
| WO | WO-2016154116 A1 | 9/2016 |
| WO | 2017/040671 A1 | 3/2017 |

OTHER PUBLICATIONS

Rajaram, Narasimhan, Tri Nguyen, and James W. Tunnell. "Lookup table-based inverse model for determining optical properties of turbid media." Journal of biomedical optics 13.5 (2008): 050501. (Year: 2008).*

International Search Report and Written Opinion dated Jun. 4, 2018 in connection with PCT/US2018/022840.

* cited by examiner

FIG. 8

TISSUE IDENTIFICATION BY AN IMAGING SYSTEM USING COLOR INFORMATION

TECHNICAL FIELD

The present disclosure relates generally to imaging systems and, more particularly, to tissue identification by an imaging system using color information.

BACKGROUND

Various forms of imaging systems are used in the healthcare and research fields, today. In some cases, the imaging may be performed in vivo, i.e., within a living organism. Such imaging systems may include, for example, endoscopic imaging systems, laparoscopic imaging systems, and the like. In other cases, the imaging may be performed ex vivo, such as in the case of imaging biopsied tissue.

Depending on the use case, images from an imaging system may be on a microscopic or macroscopic scale. For example, lenses may be used in the imaging system to magnify the images that the system captures. In another example, magnification may be achieved during processing of the captured image data. Thus, imaging systems may afford a wide variety of different views to a user.

BRIEF DESCRIPTION OF THE DRAWINGS

The embodiments herein may be better understood by referring to the following description in conjunction with the accompanying drawings in which like reference numerals indicate identically or functionally similar elements, of which.

In the figures, reference numbers refer to the same or equivalent parts of the present invention throughout the several figures of the drawing.

SUMMARY

According to the techniques described herein, an imaging device determines color information for a portion of organic tissue from one or more captured color images of the tissue. The imaging device identifies one or more optical properties of the portion of tissue based on the determined color information. The imaging device adjusts fluorescence data captured via one or more fluorescence images of the portion of organic tissue. The imaging device provides the adjusted fluorescence data to an electronic display for display.

In another embodiment, an imaging device is disclosed. The imaging device includes one or more color sensors to capture color images of a portion of organic tissue. The imaging device also includes an interface to provide display data to an electronic display, a processor coupled to the network interfaces and configured to execute one or more processes, and a memory configured to store a process executable by the processor. When executed the process is configured to determine color information for a portion of organic tissue from one or more captured color images of the tissue. The process is further configured to identify one or more optical properties of the portion of tissue based on the determined color information. The process is also configured to adjust fluorescence data captured via one or more fluorescence images of the portion of organic tissue. The process is additionally configured to provide the adjusted fluorescence data to an electronic display for display.

In another embodiment, a tangible, non-transitory, computer-readable medium is disclosed. The computer-readable medium stores program instructions that cause an imaging device to execute a process. The process includes determining color information for a portion of organic tissue from one or more captured color images of the tissue. The process also includes identifying one or more optical properties of the portion of tissue based on the determined color information. The process further includes adjusting fluorescence data captured via one or more fluorescence images of the portion of organic tissue. The process additionally includes providing the adjusted fluorescence data to an electronic display for display.

DETAILED DESCRIPTION

To provide an overall understanding of the invention, certain illustrative embodiments will now be described, including a system for generating superimposed circulatory and tissue images in video format. However, it will be understood that the methods and systems described herein can be suitably adapted to other medical imaging applications where visible light tissue images may be usefully displayed with diagnostic image information obtained from outside the visible light range and superimposed onto the visible light image. More generally, the methods and systems described herein may be adapted to any imaging application where a visible light image may be usefully displayed with a superimposed image captured from areas within the visible light image that are functionally marked to emit photons outside the visible light range by a dye or other material. For example, the systems and methods are applicable to a wide range of diagnostic or surgical applications where a target pathology, tissue type, or cell may be labeled with a fluorescent dye or other fluorescent substance. These and other applications of the systems described herein are intended to fall within the scope of the invention.

Figure 1:
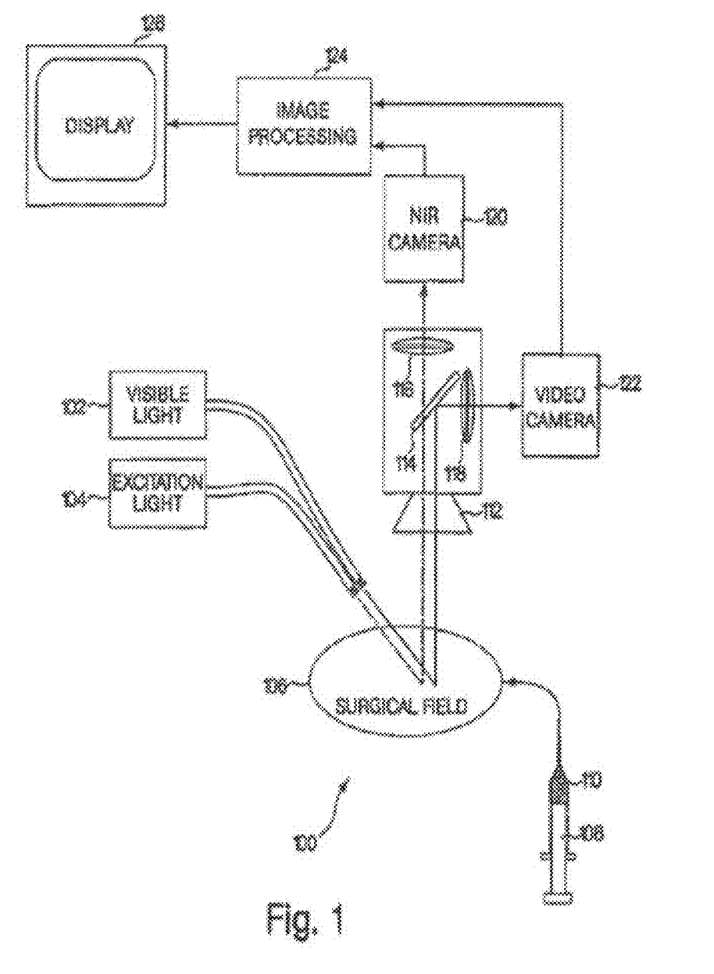
FIG. 1 shows an embodiment of an imaging system for use during open surgery.

FIG. 1 shows an embodiment of an imaging system for use during open surgery. The imaging system 100 may include a visible light source 102, and excitation light source 104, a surgical field 106, a dye source 108 containing a dye 110, a lens 112, a first filter 114, a second filter 116, a third filter 118, a near-infrared camera 120, a video camera 122, an image processing unit 124, and a display 126. In general, the visible light source 102 and the excitation light source 104 illuminate the surgical field 106. The dye 110 may be introduced from the dye source 108, such as through injection into the bloodstream of a subject. An image from the surgical field 106 is then captured by two cameras, the video camera 122 capturing a conventional, visible light image of the surgical field 106 and the near-infrared camera 120 capturing a diagnostic image based upon the distribution of the dye 110 in the surgical field 106. These images may be combined by the image processing unit 124 and presented on a display 126 where they may be used, for example, by a surgeon conducting a surgical procedure. Each aspect of the system 100 is now described in more detail.

The imaging system 100 may be surrounded by an operating area (not shown) closed to ambient light. As will become clear from the following, many visible light sources such as incandescent lamps, halogen lamps, or daylight may include a broad spectrum of electromagnetic radiation that extends beyond the range of visible light detected by the human eye and into wavelengths used in the present system as a separate optical channel for generating diagnostic images. In order to effectively detect emission in these super-visible light wavelengths, it is preferred to enclose the surgical field 106, light sources 102, 104, and cameras 120, 122 in an area that is not exposed to broadband light sources. This may be achieved by using an operating room closed to external light sources, or by using a hood or other enclosure or covering for the surgical field 106 that prevents invasion by unwanted spectrum. The visible light source 102 may then serve as a light source for the visible light camera 122, and also for provide conventional lighting within the visible light spectrum. As used herein, the term "operating area" is intended specifically to refer to an open surgical site that is closed to ambient light. Endoscopic or laparoscopic applications, as described below, are confined to surgical procedures within a closed body cavity, and do not include an operating area as that term is intended herein.

The visible light source 102 may be, for example, a near-infrared depleted white light source. This may be a one-hundred fifty Watt halogen lamp with one or more filters to deplete wavelengths greater than 700 nanometers ("nm"). Generally, any light source constrained to wavelengths between 400 nm and 700 nm may operate as the visible light source 102. In certain applications, the excitation light source 104 and resulting emission from the dye 110 may have wavelengths near or below 700 nm, as with Cy5 dye, which emits light when excited at 650 nm. These near-red dyes may be used with the present system, however, this requires a visible light source 102 that excludes a portion of the visible light spectrum in which the dye operates, i.e., a far-red depleted white light source. Similarly, applications using quantum dots as a fluorescent substance may have absorption or emission wavelengths anywhere in the visible light spectrum, and a suitable visible light source should be depleted at the wavelength(s) of interest. As such, the visible light source 102 should more generally be understood to be a source of light that includes some, but not necessarily all, of the wavelengths of visible light.

It should also be understood that, in a far-red imaging system or infrared imaging system such as those noted above, the near-infrared camera 120 described in the example embodiment will instead be a camera sensitive to the emission wavelength of the dye 110 or other fluorescent substance, and that other modifications to light sources, filters and other optics will be appropriate. Similar modifications may be made to isolate a band of wavelengths for dye excitation and emission anywhere within or outside the visible light range, provided that suitable optics, cameras, and dyes are available. Other fluorescent substances may also be used. For example, quantum dots may emit at visible light wavelengths, far-red, near-infrared, and infrared wavelengths, and at other wavelengths, typically in response to absorption below their emission wavelength. Suitable adjustments will be made to the excitation light source 104 and the emission camera, the near-infrared camera 120 in the example embodiment, for such applications. Cameras sensitive to far-red, near-infrared, and infrared wavelengths are commercially available.

The excitation light source 104 provides light at a wavelength that excites the dye 110. This may be, for example, a laser diode such as a 771 nm, 250 mW laser diode system, which may be obtained from Laser Components of Santa Rosa, Calif. Other single wavelength, narrowband, or broadband light sources may be used, provided they do not interfere with the visible light image captured by the video camera 122 or the emission wavelength of the dye 110. The near-infrared band is generally understood to include wavelengths between 700 nm and 1000 nm, and is a useful wavelength range for a number of readily available excitation light sources 104 and dyes 110 that may be used with the systems described herein. Suitable optical coupling and lenses may be provided to direct each of the visible light source 102 and the excitation light source 104 at an area of interest within the surgical field 106.

The surgical field 106 may be any area of a subject or patient that is open for a surgical procedure. This may be, for example, an open chest during a procedure such as a revascularization or cardiac gene therapy, where visualization of the circulatory system may improve identification of areas at risk for myocardial infarction. Blood flow visualization may permit an assessment of coronary arteries during a coronary artery bypass graft, or an assessment of blood flow and viability during introduction of genes for endothelial growth factor or fibroblast growth factor to induce neovascularization within ischemic regions of the heart. More generally, the surgical field 106 may include any areas of a patient's body, such as a region of the body that includes a tumor that is to be surgically removed, and that is amenable to visualization with fluorescent dyes, such as through the use of labeled antibodies.

The dye source 108 may be any instrument used for injection or other introduction of the dye 110 into a subject, such as a hypodermic needle or angiocath. Where, for example, the dye 110 is highly soluble in blood, the dye source 108 may be administered anywhere on the subject, and need not be near the surgical field 106. For example, it has been found that ZW800-1, when injected intravenously into a live laboratory rat, produced peak vasculature image strength of an open heart approximately 5-10 seconds after injection. In certain embodiments, the dye source 108 may not use injection. For example, the dye source 108 may spray or otherwise apply the dye 110 to an area of interest. Depending upon the type of dye and the imaging technique, the dye 110 may be delivered in a discrete dose, or may be continuously or intermittently applied and re-applied by the dye source 108.

The dye 110 may be any dye suitable for use in vivo and having excitation and emission wavelengths suitable for other components of the system 100. Typically, the dye 110 will be diluted to 25-50 µM for intravenous injection, such as with D5W, which may be supplemented with Cremophor EL (Sigma) and/or absolute ethanol. A number of suitable near-infrared dyes are known to those skilled in the art.

The lens 112 may be any lens suitable for receiving light from the surgical field 106 and focusing the light for image capture by the near-infrared camera 120 and the video camera 122. The lens 112 may include one or more optical coatings suitable for the wavelengths to be imaged, and may provide for manual, electronically-assisted manual, or automatic control of zoom and focus.

The first filter 114 may be positioned in the image path from the lens 112 such that a visible light image having one or more visible light wavelengths is directed toward the video camera 122, either by reflection or transmittance. An emission image from the excited dye 110 passes through the lens 112 and is directed toward the near infrared camera 120, again either through reflection or transmittance. A number of arrangements of the cameras 120, 122 and the first filter 114 are possible, and may involving reflecting or transmitting either the visible light image or the emission wavelength image.

The near-infrared camera 120 may be any still or moving image camera suitable for capturing images at the emission wavelength of the excited dye 110. The near-infrared camera may be, for example, an Orca-ER near-infrared camera with settings of gain 7, 2×2 binning, 640×480 pixel field of view, and an exposure time of 20 msec and an effective frame rate of fifteen frames per second. The Orca-ER is commercially available from Hamamatsu Photonic Systems of Bridgewater, N.J. It will be understood that the near-infrared camera 120 of FIG. 1 is only an example. An infrared camera, a far-red camera, or some other camera or video device may be used to capture an emission wavelength image, with the camera and any associated filters selected according to the wavelength of a corresponding fluorescent substance used with the imaging system. As used herein, the term "emission wavelength camera" is intended to refer to any such camera that may be used with the systems described herein.

The video camera 122 may be any video camera suitable for capturing images of the surgical field 106 in the visible light spectrum. In further embodiments, the video camera 122 may instead be a camera configured to take still images, as opposed to video. In one embodiment, the video camera 122 is a color video camera model HV-D27, commercially available from Hitachi of Tarrytown, N.Y. The video camera 122 may capture red-green-blue (RGB) images at thirty frames per second at a resolution of 640×480 pixels, or at any other number of frames or resolutions, as desired. In another example, the video camera 122 may be a high resolution Canon EOS 700 white light camera available from Canon, Melville, N.Y., although any other suitable white light camera can be used in other implementations. More generally, the near-infrared camera 120 and the video camera 122 may be any device capable of photonic detection and conversion to electronic images, including linear photodiode arrays, charge coupled device arrays, scanning photomultiplier tubes, and so forth.

The display 126 may be a television, high-definition television, computer monitor, or other display configured to receive and render signals from the image processing unit 124. The surgical field 106 may also be a neurosurgical site, with a surgical microscope used to view the surgical field 106. In this embodiment, the display 126 may be a monocular or binocular eyepiece of the surgical microscope, with the near-infrared image superimposed on the visible light image in the eyepiece. In another embodiment, the eyepiece may use direct optical coupling of the surgical field 106 to the eyepiece for conventional microscopic viewing, with the near-infrared image projected onto the eyepiece using, for example, heads-up display technology.

The image processing unit 124 may include any software and/or hardware suitable for receiving images from the cameras 120, 122, processing the images as desired, and transmitting the images to the display 126. In one embodiment, the image processing unit 124 is realized in software on a Macintosh computer equipped with a Digi-16 Snapper frame grabber for the Orca-ER, commercially available from DataCell of North Billerica, Mass., and equipped with a CG-7 frame grabber for the HV-D27, commercially available from Scion of Frederick Md., and using IPLab software, commercially available from Sanalytics of Fairfax, Va. While a Macintosh may be used in one embodiment, any general purpose computer may be programmed to perform the image processing functions described herein, including an Intel processor-based computer, or a computer using hardware from Sun Microsystems, Silicon Graphics, or any other microprocessor manufacturer.

Generally, the image processing unit 124 should be capable of digital filtering, gain adjustment, color balancing, and any other conventional image processing functions. The image from the near-infrared camera 120 is also typically shifted into the visible light range for display at some prominent wavelength, e.g., a color distinct from the visible light colors of the surgical field 106, so that a superimposed image will clearly depict the dye. The image processing unit 124 may also perform image processing to combine the image from the near-infrared camera 120 and the video camera 122. Where the images are displayed side-by-side, this may simply entail rendering the images in suitable locations on a computer screen. Where the images are superimposed, a frame rate adjustment may be required. That is, if the video camera 122 is capturing images at the conventional rate of thirty frames per second and the near-infrared camera 120 is taking still pictures with an effective frame rate of fifteen frames per second, some additional processing may be required to render the superimposed images concurrently. This may entail either reducing the frame rate of the video camera 122 to the frame rate of the near-infrared camera 120 either by using every other frame of video data or averaging or otherwise interpolating video data to a slower frame rate. This may instead entail increasing the frame rate of the near-infrared image data, either by holding each frame of near-infrared data over successive frames of video data or extrapolating near-infrared data, such as by warping the near-infrared image according to changes in the video image or employing other known image processing techniques.

Generally, any combination of software or hardware may be used in the image processing unit 124. The functions of the image processing unit 124 may be realized, for example, in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The functions may also, or instead, include one or more application specific integrated circuits, programmable gate arrays, programmable array logic devices, or any other device or devices that may be configured to process electronic signals. Any combination of the above circuits and components, whether packaged discretely, as a chip, as a chipset, or as a die, may be suitably adapted to use with the systems described herein.

It will further be appreciated that each function of the image processing unit 124 may be realized as computer executable code created using a structured programming language such as C, an object-oriented programming language such as C++ or Java, or any other high-level or low-level programming language that may be compiled or interpreted to run on one of the above devices, as well as heterogeneous combinations of processors, processor architectures, or combinations of different hardware and software. The image processing unit 124 may be deployed using software technologies or development environments including a mix of software languages, such as Java, C++, Oracle databases, SQL, and so forth. It will be further appreciated that the functions of the image processing unit 124 may be realized in hardware, software, or some combination of these.

In one embodiment, the visible light source 102 is a near-infrared depleted visible light source, the excitation light source 104 is a 760 nm, 2.5 W laser diode, the dye 110 is indocyanine green or ZW800-1, the first filter 114 is a 780 nm dichroic mirror configured to transmit near-infrared light and reflect visible light, the second filter 116 is a 781 nm longpass emission filter, and the third filter 118 is a 400 nm to 700 nm filter. The image processing unit 124 is a computer with software for image capture from the near-infrared camera 120 and the video camera 122, for making suitable color adjustment to the images from the near-infrared camera 120, for making frame rate adjustments to the video camera 122 image, and for combining the two images for superimposed display on the display 126.

The systems described above have numerous surgical applications. For example, the system may be deployed as an aid to cardiac surgery, where it may be used intraoperatively for direct visualization of cardiac blood flow, for direct visualization of myocardium at risk for infarction, and for image-guided placement of gene therapy and other medicinals to areas of interest. The system may be deployed as an aid to oncological surgery, where it may be used for direct visualization of tumor cells in a surgical field or for image-guided placement of gene therapy and other medicinals to an area of interest. The system may be deployed as an aid to general surgery for direct visualization of any function amenable to imaging with fluorescent dyes, including blood flow and tissue viability. In dermatology, the system may be used for sensitive detection of malignant cells or other skin conditions, and for non-surgical diagnosis of dermatological diseases using near-infrared ligands and/or antibodies.

Figure 2:
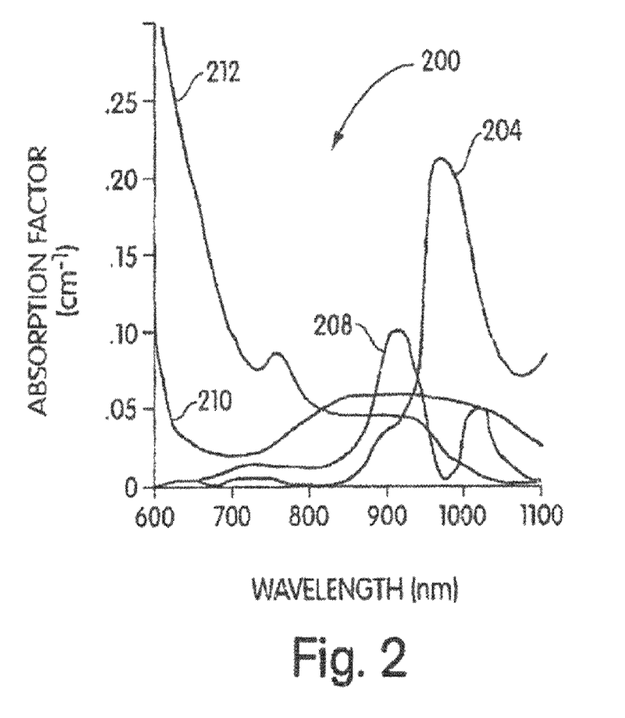
FIG. 2 shows a near-infrared window used by the imaging system.

FIG. 2 shows a near-infrared window used by the imaging system. The near-infrared window 200 is characterized by wavelengths where absorbance is at a minimum. The components of living tissue with significant near-infrared absorbance include water 204, lipid 208, oxygenated hemoglobin 210, and deoxygenated hemoglobin 212. As shown in FIG. 2, oxygenated hemoglobin 210 and deoxygenated hemoglobin have significant absorbance below 700 nm. By contrast, lipids 208 and water 204 have significant absorbance above 900 nm. Between 700 nm and 900 nm, these absorbances reach a cumulative minimum referred to as the near-infrared window 200. While use of excitation and emission wavelengths outside the near-infrared window 200 is possible, as described in some of the examples above, fluorescence imaging within the near-infrared window 200 offers several advantages including low tissue autofluorescence, minimized tissue scatter, and relatively deep penetration depths. While the near-infrared window 200 is one useful wavelength range for imaging, the systems described herein are not limited to either excitation or emission wavelengths in this window, and may employ, for example, far-red light wavelengths below the near-infrared window 200, or infrared light wavelengths above the near-infrared window 200, both of which may be captured using commercially available imaging equipment.

Figure 3:
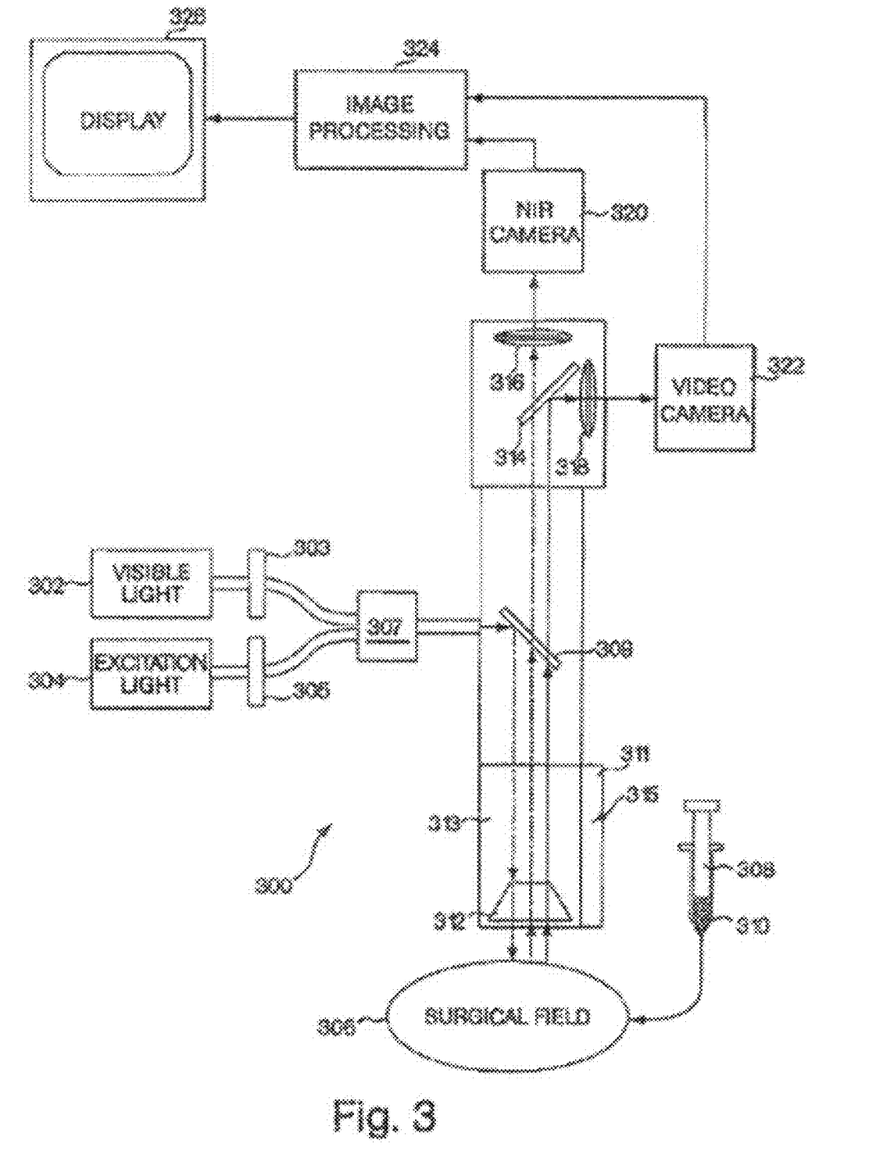
FIG. 3 shows an embodiment of an imaging system for use in an endoscopic tool.

FIG. 3 shows an embodiment of an imaging system for use in an endoscopic tool. The imaging system 300 may include a visible light source 302, and excitation light source 304, a surgical field 306, a dye source 308 containing a dye 310, a lens 312, a first filter 314, a second filter 316, a third filter 318, a near-infrared camera 320, a video camera 322, an image processing unit 324, and a display 326. In general, the visible light source 302 and the excitation light source 304 illuminate the surgical field 306. The dye 310 may be introduced from the dye source 308, such as through injection into the bloodstream of a subject. An image from the surgical field 306 is then captured by two cameras, the video camera 322 capturing a conventional, visible light image of the surgical field 306 and the near-infrared camera 320 capturing a diagnostic image based upon the distribution of the dye 310 in the surgical field 306. These images may be combined by the image processing unit 324 and presented on a display 326 where they may be used, for example, by a surgeon conducting a surgical procedure. In general, each of these components may be any of those components similarly described with reference to FIG. 1 above. Differences for an endoscopic tool are now described.

The imaging system 300 for use as an endoscopic tool may further include a first lens/collimator 303 for the visible light source, a second lens/collimator 305 for the excitation light source 304, an optical coupler 307 that combines the excitation light and the visible light, a dichroic mirror 309, and an endoscope 311 having a first cavity 313 and a second cavity 315.

The first lens/collimator 303, the second lens/collimator 305, and the optical coupler 307 serve to combine the excitation light and the visible light into a single light source. This light source is coupled into the first cavity 313 through the dichroic mirror 309. In one embodiment, the dichroic mirror 309 preferably provides fifty percent reflection of light having wavelengths from 400 nm to 700 nm, in order to optimize an intensity of visible light that reaches the video camera 322 after illuminating the surgical field 306 and passing through the dichroic mirror 309 on its return path to the video camera 322. The dichroic mirror 309 also preferably has greater than ninety percent reflection of wavelength from the excitation light source 304, such as between 700 nm and 785 nm, so that these wavelengths are not transmitted to the cameras 320, 322 after reflecting off the surgical field. Using this arrangement, visible and excitation light sources 302, 304 share the first cavity 313 of the endoscope with the return light path for a visible light image and an emission wavelength image.

The second cavity 315 of the endoscope 311 may be provided for insertion of a tool, such as an optical tool like a laser for irradiation of a site in the surgical field 306, or a physical tool like an instrument for taking a biopsy of tissue within the surgical field. By combining the optical paths of the imaging system 300 within a single cavity of the endoscope 311, the combined gauge of the first cavity 313 for imaging and the second cavity 315 may be advantageously reduced.

The imaging system 300 may instead be used with a laparoscope. Typically, a laparoscope is inserted into a body cavity through an incision, as distinguished from an endoscope which is inserted through an existing body opening such as the throat or rectum. A laparoscope has a different form factor than an endoscope, including different dimensional requirements. Furthermore, use of a laparoscope involves at least one additional step of making an incision into a body so that the laparoscope may be inserted into a body cavity. The laparoscope may be used with any of the imaging systems described above, and the imaging system 300 of FIG. 3 in particular would provide the benefit of a narrower bore for illumination and imaging optics.

It will further be appreciated that the imaging system 300 may be used to simplify imaging devices other than endoscopes and laparoscopes, such as by providing an integrated, coaxial illumination and image capture device using the techniques described above.

In addition to the surgical applications noted above in reference to FIG. 1, the endoscopic tool of FIG. 3 may be used for direct visualization of malignant or pre-malignant areas within a body cavity, or for image-guided placement of gene therapy and other medicinals to an area of interest within the body cavity.

Figure 4:
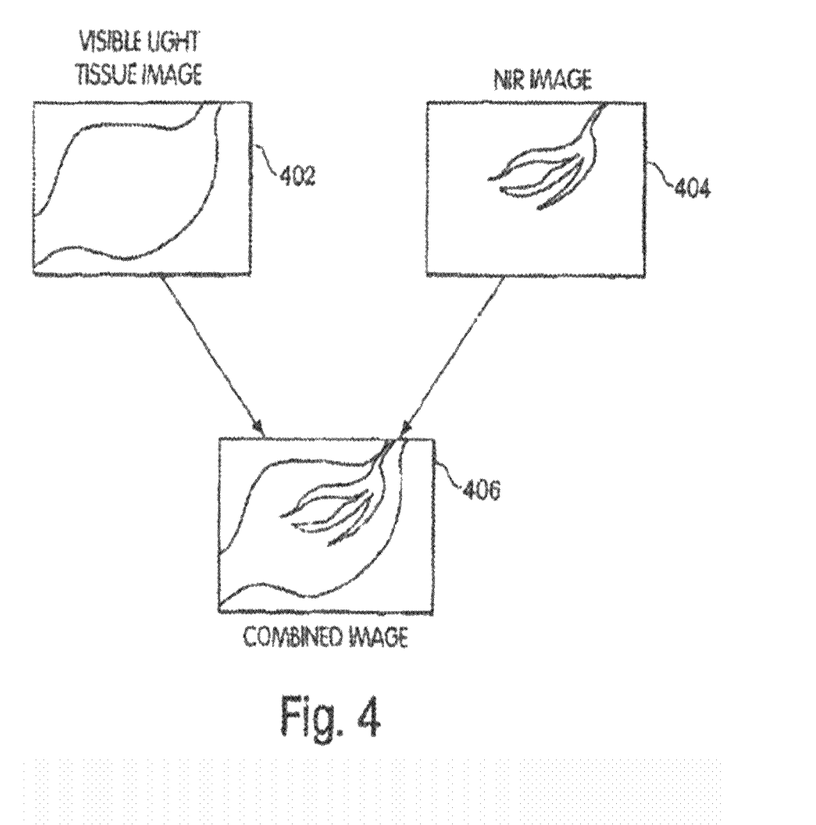
FIG. 4 shows the combination of visible and fluorescence images.

FIG. 4 shows an image displaying both a circulatory system and surrounding tissue. As described above, a visible light tissue image 402 is captured of tissue within a surgical field. As noted above, the visible light tissue image 402 may include a subset of visible light wavelengths when an optical channel for dye imaging includes a wavelength within the visible light range. A near-infrared image 404 is also captured of the same (or an overlapping) field of view of the surgical field. Although referred to here for convenience as a near-infrared image, it should be clear that the dye-based image 404 may also, or instead, employ other wavelengths, such as far-red or infrared wavelengths. The near-infrared image 404 may be shifted to a visible wavelength for display, preferably using a color that is prominent when superimposed on the visible light tissue image 402. The images 402, 404 may be frame-rate adjusted as appropriate for video display of the surgical field.

The images may be displayed separately as the visible light tissue image 402 and the near-infrared image 404. Or the images 402, 404 may be combined into a combined image 406 by the image processing unit described above. The combined image 406 may then be used as an aid to the procedures described above, or to any other surgical or diagnostic procedure that might benefit from the dye-based imaging techniques described herein.

Figure 5:
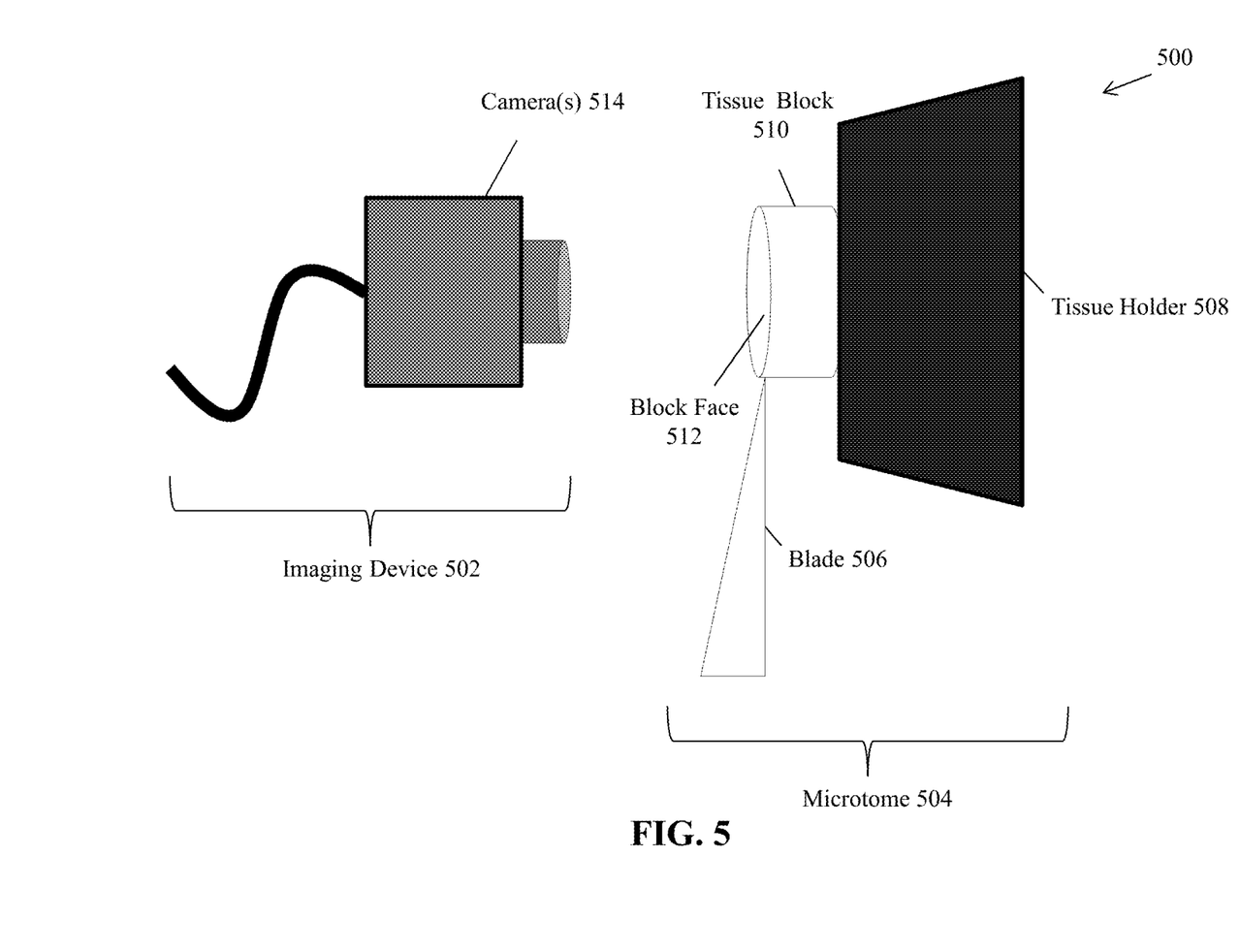
FIG. 5 illustrates an example of imaging a block of tissue using the imaging techniques herein.

FIG. 5 illustrates an example of imaging a block of tissue using the imaging techniques herein, according to various embodiments. As noted above, the techniques herein may be used for in vivo imaging, such as in the case of open surgical, endoscopic, or laparoscopic imaging. In further embodiments, the techniques herein can also be used to perform ex vivo imaging of organic tissue that has been excised from a host organism. One such example is illustrated in system 500 shown, which generally includes an imaging device/system 502 and a microtome 504.

In general, a microtome is a specialized tool used to slice a collected sample into very fine slices. Typically, this is performed using one or more blades. However, some microtomes may also use a laser as the cutting mechanism for the sample. During operation, the sample and/or the cutting mechanism may move relative to one another, to remove a very thin slice of the sample from a sample block. For example, as shown, consider a tissue block 510 of organic tissue that has been mounted to a tissue holder 508 within a microtome. To obtain a slice of tissue material from tissue block 510, a blade 506 may cut through tissue block 510 along an axis that is substantially parallel to the block face 512 of tissue block 510. As would be appreciated, this may be achieved by maintaining the tissue holder 508 at a static location and moving blade 506 through the tissue block 510, holding blade 506 at a static location and moving tissue holder 508 and tissue block 510 across blade 506, or a combination thereof. The width of the resulting tissue slice will be a function of the distance of the blade 506 relative to the surface of black face 512.

In some embodiments, the microtome 504 may also be a specialized form of microtome known as a cryomicrotome (for small samples) or a cryomacrotome (for large samples). Collectively, the term 'cryotome' may refer to either such device. Cryomicrotomes typically operate in a manner similar to that of other microtomes (i.e., to obtain slices of sample material), but are adapted for specific use in slicing frozen samples. Notably, the inner chamber of a cryotome may maintain an inner temperature that is much lower than that of the ambient room temperature, to aid in maintaining the frozen state of the sample. Typically, the sample (e.g., tissue block 510) is first prepared by suspending and freezing the sample within an optimal cutting temperature (OCT) compound.

During operation, imaging device 502 may operate camera(s) 514, to image the block face 512 of tissue block 510, in accordance with the techniques herein. Notably, imaging device 502 may be configured to capture both visible and near-infrared fluorescence images of tissue block 510 and output a combined image to an electronic display coupled to imaging device 502. For example, suitable systems for imaging device 502 may include the K-FLARE® and LAB-FLARE® (FLuorescence-Assisted Resection and Exploration) imaging systems available from Curadel LLC, Marlborough, Mass. In other words, during preparation, tissue block 510 may be infused with a dye/fluorophore, either while still in vivo or ex vivo, thereby allowing imaging device 502 to capture fluorescence images of the contrast agent within tissue block 510. For example, in the case of a cryotome, tissue block 510 may be infused with the agent, prior to freezing within the OCT compound. A heated glass window can be used to prevent condensation from interfering with imaging by the camera.

Imaging of block face 512 by imaging device 502 may be performed repeatedly, as follows. First, the topmost layer of tissue block 510 may be removed using blade 506. Next, imaging device 502 may be operated to capture both color and fluorescence/near infrared images of the exposed block face 512. In some cases, imaging device 502 may include a visible light source that works in conjunction with its color camera(s) 514. In other cases, ambient room lighting may be used as the light source. Similarly, the infrared camera(s) 514 of imaging device 502 may operate in conjunction with one or more infrared light sources of imaging device 502, to capture the fluorescence images and obtain detailed images of the fluorescent dye suspended within tissue block 510.

Of note, color lookup tables, which relate the RGB color measured to a particular tissue or organ, may need to differ for block face samples imaged within microtomes/cryotomes because of the effect of paraffin wax, ice crystals, and/or OCT on color hue. It is anticipated in this invention, in fact, that unique color lookup tables will need to be created for each type of imaging employed. For example, the color lookup table used for block face imaging within a microtome will likely be different from the color lookup table used for open surgery.

In turn, a processing circuit of imaging device 502 may combine the color and fluorescence images (e.g., as an overlay image, etc.), and provide the display information to an electronic display. In some embodiments, the captured images across different iterations of slicing and imaging may be combined to form a three dimensional (3-D) representation of the detected fluorescent dye within tissue block 510.

In further embodiments, imaging device 502 may be used to image the resulting slices of tissue block 510 in lieu of, or in combination with, that of the images of block face 512. For example, imaging device 502 may be operated in conjunction with a microscope, to capture images of histologic slices obtained through the operation of microtome 504 on tissue block 510.

As noted above, fluorescence imaging has a number of potential applications in the fields of medical and research imaging. In various embodiments, during this imaging, the system may correct for undesirable remnants in the captured fluorescence data that are due to the optical properties of the imaged tissue. For example, the amount of scatter, absorption, etc. of the imaged tissue may otherwise result in a "halo" appearing around the fluorescent dye in the displayed image, if not corrected for by the imaging system beforehand.

In some embodiments, one or more hardcoded or user-provided parameters may control the extent of correction applied to the fluorescence data, prior to presentation to an electronic display. However, as each type of tissue/organ has its own unique optical properties, a one-size-fits-all approach to these parameters often produces adequate, but suboptimal, results. Further, if the captured image includes portions of multiple tissue types, adjusting for the correction for one type may be at the expense of the other type(s) present in the image.

Tissue Identification Using Color Information

In certain aspects, the techniques herein allow for the automatic identification of tissue type(s) present in captured images. Notably, the techniques herein leverage the fact that most organs and other forms of tissue in living animals have very distinct colors, with minor variations among species. For example, the color red primarily only exists in muscle, spleen, liver, and blood, with the color caused by the pigmented proteins myoglobin and hemoglobin, respectively. Because of the unique color of such tissues, and because the optical properties of many types of organs/tissues are known (e.g., absorption, scatter, etc.), certain aspects of the techniques herein use color information captured by the imaging device to identify the type of tissue present in an image and, in turn, determine the optical properties of the imaged portion of tissue. These optical properties can then be used, for example, to apply corrections to captured fluorescence data, prior to display by an electronic display.

More specifically, the tissue identification techniques herein may use the color separation capabilities of RGB-based color cameras to define tissue color precisely as an RGB value, then to use this value to search a lookup table to define the tissue and thus its known optical properties. For example, in the case of block face imaging (e.g., within a microtome or cryotome as in FIG. 5), visible photons penetrate only 100-200 microns into the tissue block, meaning that the measured color is truly representative of the tissue/organ being imaged and is not influenced by underlying structures.

Figure 6:
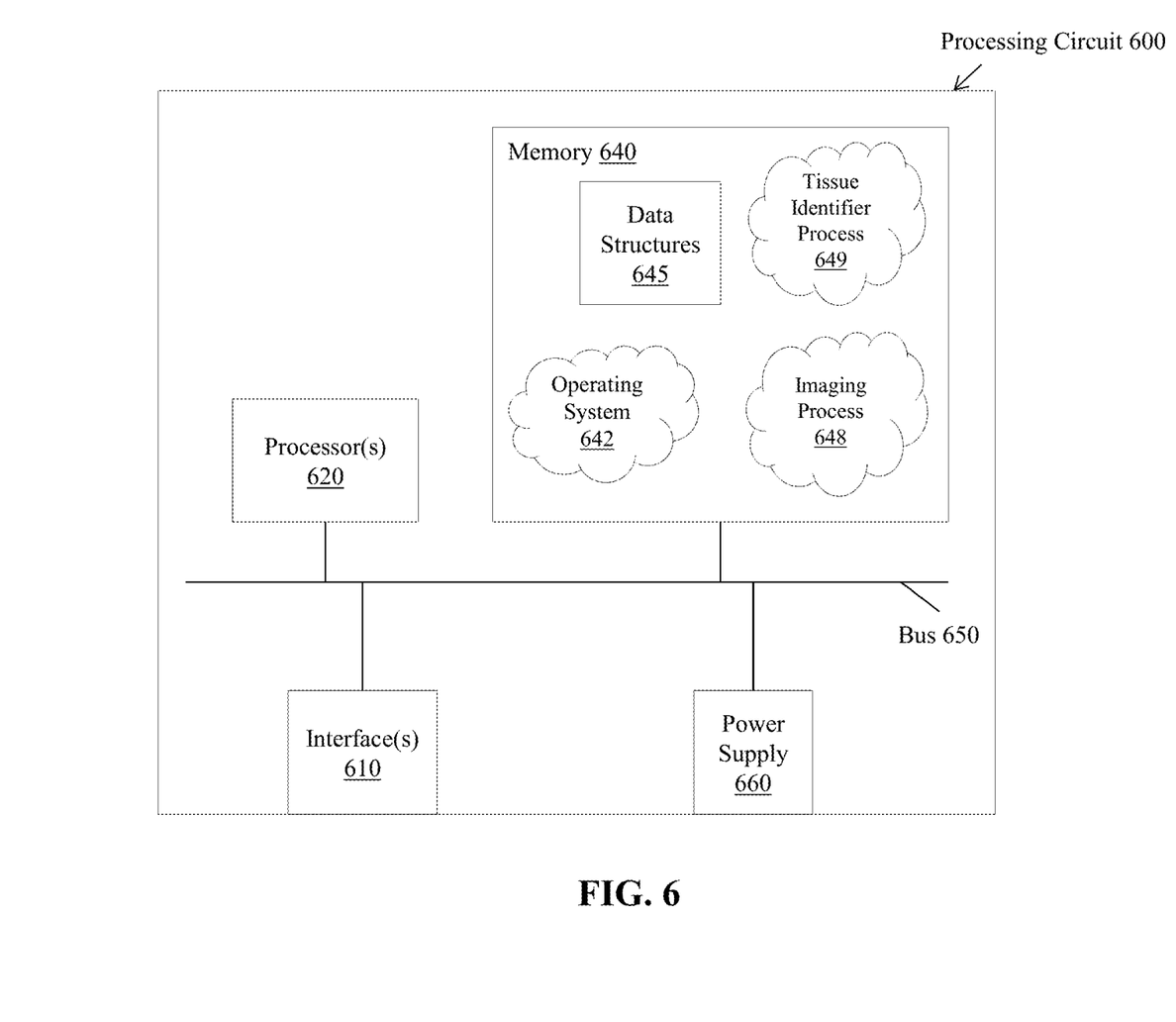
FIG. 6 illustrates an example processing circuit.

FIG. 6 illustrates a processing circuit 600 that may be used as part of any of the imaging systems/devices described herein, according to various embodiments. As shown, processing circuit 600 may comprise one or more network interfaces 610 (e.g., wired, wireless, etc.), at least one processor 620, and a memory 640 interconnected by a system bus 650, as well as a power supply 660 that provides electrical power to processing circuit 600.

The interface(s) 610 contain the mechanical, electrical, and signaling circuitry for communicating data with other components of the imaging device/system and/or with other computing devices (e.g., via a computer network). For example, interface(s) 610 may be configured to transmit and/or receive data using a variety of different communication protocols via a communication network (e.g., to upload image data to a cloud service, to download software or data updates, etc.). In further examples, interface(s) 610 may be coupled to the various components of the imaging device to provide control commands to the camera(s), lighting source(s), etc., of the imaging device and/or to receive captured image data from the camera(s). Interface(s) 610 may also be in communication with an electronic display to display the resulting images after processing.

The memory 640 comprises a plurality of storage locations that are addressable by the processor 620 and the network interfaces 610 for storing software programs and data structures associated with the embodiments described herein. The processor 620 may comprise hardware elements or hardware logic adapted to execute the software programs and manipulate the data structures 645. An operating system 642, portions of which are typically resident in memory 640 and executed by the processor 620, functionally organizes the device by, inter alia, invoking operations in support of software processes and/or services executing on the device. These software processes and/or services may comprise an imaging process 648 and, illustratively, a tissue identifier process 649, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, where certain processes have been shown separately, those skilled in the art will appreciate that processes may be routines or modules within other processes.

Imaging process 648, when executed by processor(s) 620, may be operable to perform any of the imaging functions described herein. For example, imaging process 648 may provide control over the components of the imaging device, to capture both color and fluorescence image data regarding organic tissue of interest. In turn, imaging process 648 may process the captured image data to form display data for display by an electronic display. For example, imaging process 648 may combine both the color and fluorescence data into an overlay image for display by the electronic display. Such a displayed image may be fully in color or at least partially in black and white or grayscale, in various embodiments.

According to various embodiments, tissue identifier process 249 may operate in conjunction with imaging process 648, to use the color data captured by the color camera(s) of the imaging device to identify the tissue type(s) present in the captured images. As would be appreciated, optimal results may be obtained when the camera is pre-calibrated using known color standards. In turn, tissue identifier process 249 may provide an indication of the identified tissue type(s) to be included in the display data sent to the electronic display. For example, a portion of tissue in a displayed image may be labeled with its corresponding tissue type. In another embodiment, the indication may be displayed independently, such as part of an introductory screen, details screen, or the like.

Figure 7:
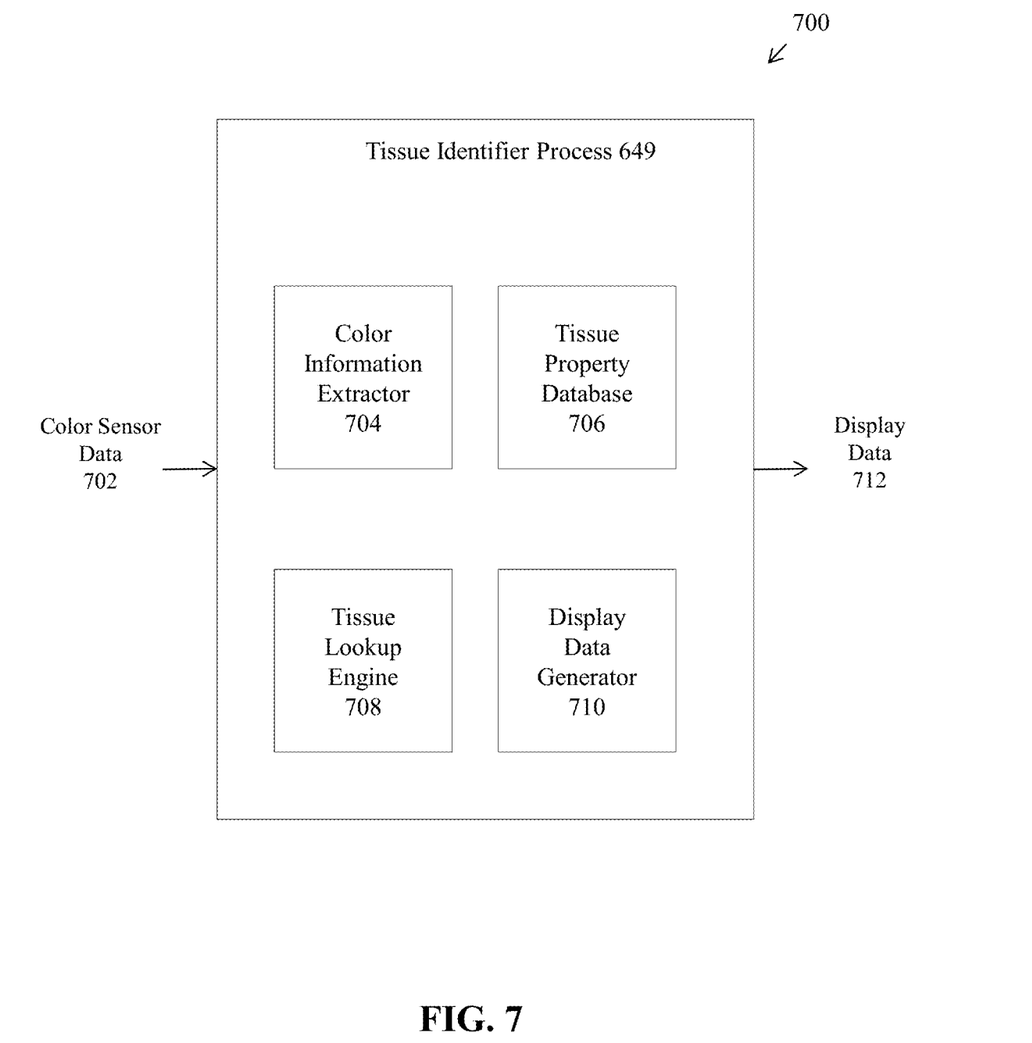
FIG. 7 illustrates an example architecture for identifying a tissue type.

FIG. 7 illustrates an example architecture 700 for identifying a tissue type, according to various embodiments. As shown in architecture 700, tissue identifier process 249 may include a number of sub-processes and memory locations 704-710, to implement the techniques herein. As would be appreciated, these sub-processes and memory locations are illustrative only and can be combined or removed, as desired during implementation. Further, these sub-processes and memory locations may be implemented on a single processing circuit or across multiple, distributed devices, in various cases. In such distributed implementations, the set of distributed devices may be viewed itself as a processing circuit. Additionally, further embodiments provide for some or all of architecture 700 to be implemented as a remote or cloud-based service.

As shown, tissue identifier process 649 may receive captured color sensor data 702 from one or more color cameras of the imaging device. Typically, color sensor data 702 may comprise red, green, and blue (RGB) color information captured by the corresponding filters and sensors of the camera(s) or may be raw data (e.g., wavelength data, etc.) converted into color information by color information extractor 704. Color sensor data 702 may also be associated with any number of pixels, thus allowing each individual pixel to have its own RGB color information. It will be apparent to those skilled in the art that color information may also be represented by numerical schemes other than RGB, such as Hex, HSL, HWB, CMYK, and NCOL.

In general, tissue identifier process 649 may extract the color information for a set of one or more pixels from color sensor data 702 and provide the extracted color information to tissue lookup engine 708. In turn, tissue lookup engine 708 may use the color information to perform a lookup of the tissue type and/or corresponding optical properties of the tissue type using tissue property database 706.

In various embodiments, tissue property database 706 may comprise one or more tables or other data structures that relate color information (e.g., RGB, etc.) to tissue types and/or tissue optical properties of various tissue types. For example, the article Optical Properties of Biological Tissue: a Review by Steven L. Jacques and published in Physics in Medicine and Biology, Vol. 58, No. 11 (2013), which is incorporated by reference herein, provides a comparison of the optical properties of a number of different organ/tissue types. By storing such properties in tissue property database 706, tissue lookup engine 708 can then perform a lookup of the color information from color information extractor 704, to identify the tissue type and/or corresponding tissue optical properties found within the set of pixels under analysis.

In some cases, the color information in tissue property database 706 for a given tissue type may be a range of color values. Notably, there may not be a direct 1:1 mapping between a given tissue type and an RGB value. Further, there may be multiple entries in tissue property database 706 for the same general tissue type that account for different tissue subtypes. For example, there may be two entries in tissue property database 706 for liver tissue: one for raw liver tissue and another for liver tissue encased in OCT compound, which both may exhibit different color and/or optical properties. Thus, in some embodiments, there may be some overlap in the associated color ranges for different tissue types within tissue property database 706. In addition, the tissue type may itself be a lookup value within tissue property database 706 or, alternatively, the optical properties of the tissue type may be mapped directly to the color information for that tissue type.

Tissue lookup engine 708 may employ any number of techniques to determine the tissue type of a portion of tissue shown within a captured image. In a simple case, tissue lookup engine 708 may perform a lookup of the color information in tissue property database 706 on a per-pixel basis. However, as noted, there may be some ambiguity, such as when there are overlapping color ranges for different tissue types, etc. In further embodiments, tissue lookup engine 708 may aggregate or otherwise group the color information from color information extractor 704 and use the aggregated color information to perform a lookup in tissue property database 706. For example, tissue lookup engine 708 may calculate the mean, median, average, or other statistical value across the set of pixels for the portion of tissue, and use this value to perform the lookup. In another embodiment, tissue lookup engine 708 may look to the neighboring pixels of a given pixel under scrutiny, to ensure consistency across identified tissue types. For example, if a given pixel would otherwise be identified as liver tissue in OCT compound, but its surrounding pixels are identified as raw liver tissue, tissue lookup engine 708 may also identify the pixel as showing raw liver tissue.

In various embodiments, tissue lookup engine 708 may use machine learning to identify a tissue type and/or tissue optical properties based on the captured color information for the portion of imaged tissue. Generally, machine learning refers to any form of programmatic technique that can adapt to new forms of input data and produce a corresponding output. For example, tissue lookup engine 708 may be able to output a set of one or more tissue optical properties in view of a set of input color information, even when not explicitly programmed to match the input color information to the output optical properties(s).

A machine learning-based process may employ one or more supervised, unsupervised, or semi-supervised machine learning models to analyze the captured images of the subject. Generally, supervised learning entails the use of a training dataset, which is used to train the model to apply labels to the input data. For example, the training data may include sample images that have one or more labeled tissue types within corresponding regions of the images. On the other end of the spectrum are unsupervised techniques that do not require a training set of labels. Semi-supervised learning approaches take a middle ground approach that uses a greatly reduced set of labeled training data.

Preferably, the machine learning model(s) of tissue lookup engine 708 may include one or more deep-learning classifiers. Such a classifier may, for example, attempt to classify/label a given image or portion of an image based on a training set of labeled image data. Generally, deep-learning refers to a branch of machine learning that attempts to identify and leverage otherwise unseen patterns in the input data that may exist at one or more layers of abstraction from the input data. In some embodiments, a given classifier of tissue lookup engine 708 may comprise one or more trained artificial neural network (ANN), to classify the input color data (e.g., classify/label the tissue type). For example, a classifier of tissue lookup engine 708 may be based on a convolution neural network (CNN) that uses a feed-forward approach. In another example, the classifier may use one or more multilayer perceptron (MLP) models.

Further examples of machine learning techniques that tissue lookup engine 708 may use can include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), support vector machines (SVMs), logistic or other regression, Markov models or chains, principal component analysis (PCA) (e.g., for linear models), replicating reservoir networks (e.g., for non-linear models, typically for time series), random forest classification, or the like.

In yet another embodiment, tissue lookup engine 708 may identify a tissue type in an image based on known anatomical relationships between different tissue types. For example, assume that a given color image includes a portion of membrane and a portion of liver tissue. Based in part on the identification and known location of the membrane tissue relative to the liver, tissue lookup engine 708 may determine that the image also includes a portion of liver tissue.

Display data generator 710 may receive the one or more optical properties from tissue lookup engine 708 and use the optical properties to generate display data 712 for display by an electronic display. For example, when used in conjunction with imaging process 648, display data generator 710 may use the optical properties (e.g., scatter, absorption, anisotropy, etc.) to correct for aberrations/unwanted remnants in the fluorescence image(s) used as part of display data 712 (e.g., to reduce or eliminate halo effects, etc.).

In cases in which multiple tissue types are shown in the captured images, display data generator 710 may apply the appropriate corrections to the corresponding regions or pixels of the image(s) that are associated with the different tissue types, in one embodiment. For example, if one tissue type is shown in the bottom left corner of the image(s) and another tissue type is shown throughout the rest of the image(s), display data generator 710 may apply one correction to the bottom left corner and another correction to the remainder of the image(s) based on their respective tissue optical properties.

In further embodiments, display data 712 may comprise a label or other indicia (e.g., text, coloration, etc.) that is displayed in conjunction with an image of the imaged tissue. For example, the final displayed image may comprise a captured image of the area, with a fluorescence overlay indicating the location of the dye/fluorophore, as well as one or more labels for the different tissue types shown in the image. Notably, by correlating the identified tissue type back to the input pixels, display data generator 710 can position the indication of the tissue type in the displayed image, accordingly.

Figure 8:
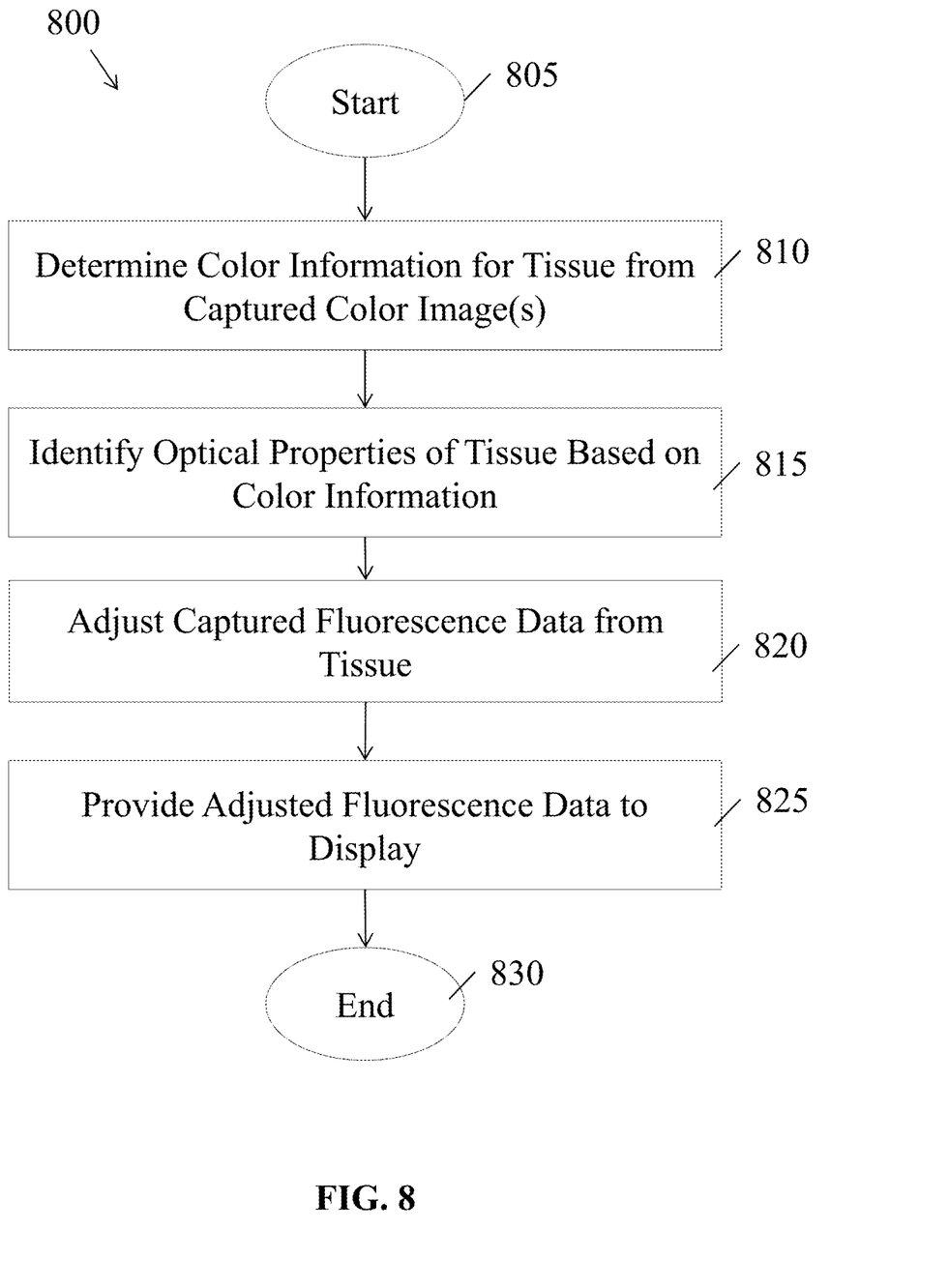
FIG. 8 illustrates an example simplified procedure for identifying a tissue type and using the identification to correct for fluorescence artifacts.

FIG. 8 illustrates an example simplified procedure for identifying a tissue type and using the identification to correct for fluorescence artifacts, in accordance with the embodiments herein. In general, procedure 800 may be performed by an imaging device having a processing circuit (e.g., processing circuit 600) that executes stored machine instructions (e.g., processes 648-649). Procedure 800 may start at step 805 and continues on to step 810 where, as described in greater detail, the imaging device may determine color information for a portion of organic tissue from one or more captured color images of the tissue. For example, the imaging device may receive the captured color image(s) of the portion of organic tissue. As would be appreciated, the portion of the tissue may be the only tissue present in the captured color image(s) or may comprise only a portion of the total image(s). In various embodiments, the captured image(s) may be of in vivo or ex vivo tissue. For example, the color image(s) may be of in vivo tissue and captured from an open surgical area, via an endoscope or laparoscope, or the like. In another example, the color image(s) may be of an ex vivo sample of tissue and captured from the block face of tissue mounted in a microtome (e.g., cryotome, etc.), histologic slice, or the like. In turn, the device may determine color information for the portion of tissue such as, e.g., RGB or other color information.

At step 815, as detailed above, the imaging device may identify one or more optical properties of the portion of tissue based on the determined color information. Notably, each type of tissue may have specific color properties or a range of color properties, as well as other optical properties, such as scatter, absorption, anisotropy, or the like. In various embodiments, the device may use the determined color information to perform a lookup of the optical properties of the tissue type either directly (e.g., the database may directly map color information to optical properties) or indirectly (e.g., the database may map color information to a tissue type which is then mapped to the optical properties). In further embodiments, the device may use machine learning, averaging, nearest neighbor analysis, or the like, to determine the tissue type and/or optical properties for the portion of organic tissue.

At step 820, the imaging device may adjust captured fluorescence data for the portion of tissue based on the identified one or more optical properties, as described in greater detail above. Notably, the techniques herein may be used to capture images of the presence of a fluorescent dye within a portion of tissue (e.g., using near infrared imaging, etc.). By leveraging the identified tissue type for the portion of tissue, the imaging device may adjust the captured fluorescence data by accounting for artifacts created by scattering, absorption, etc. of the portion of tissue. For example, a fluorescence point source within scattering tissue will appear as a blurred circle on the surface of the tissue. Knowing the bulk optical properties of the tissue permits correction of this artifact using de-blurring algorithms known to those skilled in the art. Similarly, that same point source might be significantly attenuated due to tissue absorption. Again, this artifact can be corrected using known tissue optical properties. Rather than using bulk tissue properties, correction of scattering and absorption artifacts can be further improved if the local values of each tissue slice can be determined, as detailed above, using block face imaging.

At step 825, as detailed above, the imaging device may provide the adjusted fluorescence data to an electronic display for presentation to a user. For example, the some embodiments, the displayed image may include both the adjusted fluorescence data from a captured fluorescence image and visible image data from one or more captured visible images (e.g., a color image as in step 810, a black and white or grayscale image, etc.). Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

It will be appreciated that the above functionality is merely illustrative, and that other dyes, imaging hardware, and optics may be usefully deployed with the imaging systems described herein. For example, an endoscopic tool may employ a still-image imaging system for diagnostic photography within a body cavity. Or any of the imaging systems may be used as described above with excitation and/or emission wavelengths in the far-red spectrum. Through minor adaptations that would be clear to one of ordinary skill in the art, the system could be configured to image two or more functions (i.e., tumor and blood flow) at the same time that a visible light image is captured by associating each function with a different dye having a different emission wavelength. Non-medical applications exist for the imaging system. For example, dyes in a solution form may be sprayed on a mechanical component to identify oxidation, surface defects, or the like. Dyes could also be used to track gas, steam, or air flow through a pressurized system, and in particular to identify leaks around fittings and valves. These and other arrangements and adaptations of the subject matter discussed herein are intended to fall within the scope of the invention. By way of example, a multi-channel imaging system applying the principles above is now described in greater detail.

In general, a medical imaging system may include a visible light source providing light over a range of wavelengths that includes one or more wavelengths of visible light, and an excitation light source providing light at one or more wavelengths outside the range of wavelengths of the visible light source. The one or more wavelengths are selected to excite one or more fluorescent substances, which emit fluorescence photons at different emission wavelengths. The system further includes an electronic imaging device, an optical guide that couples the image to the electronic image capture device, such as NIR and visible-light color cameras, and at least two dichroic mirrors or filters for separating the visible light from the two or more NIR wavelengths in the optical path of the system.

As will be appreciated, the above examples are intended only for the understanding of certain aspects of the techniques herein and are not limiting in nature. While the techniques are described primarily with respect to a particular device or system, the disclosed processes may be executed by other devices according to further implementations. For example, while the techniques herein are described primarily with respect to medical and research imaging, the techniques herein are not limited as such and can be adapted for use in other industries, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by an imaging device, color information for a portion of organic tissue from one or more captured color images of the organic tissue;
   identifying, by the imaging device, one or more optical properties of the portion of organic tissue using the determined color information and a color lookup table that relates one or more colors with one or more respective types of organic tissues, wherein the determined color information is associated with the one or more optical properties in the color lookup table;
   adjusting, by the imaging device and based on the one or more optical properties in the color lookup table, fluorescence data captured via one or more fluorescence images of the portion of organic tissue to correct one or more artifacts in the one or more fluorescence images; and
   providing, by the imaging device, the adjusted fluorescence data to an electronic display for display.

2. The method as in claim 1, wherein the color information comprises captured red, green, and blue (RGB) color information from the one or more captured color images.

3. The method as in claim 1, wherein the fluorescence data indicates the presence of a fluorescent dye present in the portion of organic tissue.

4. The method as in claim 1, wherein the organic tissue is associated with the determined color information in the color lookup table.

5. The method as in claim 1, wherein the one or more optical properties of the portion of organic tissue comprise at least one of: scatter, absorption, or anisotropy.

6. The method as in claim 1, wherein the association of the determined color information with the one or more optical properties in the color lookup table is generated by a machine learning-based process.

7. The method as in claim 1, wherein the one or more color images and the one or more fluorescence images are captured while the portion of organic tissue is mounted by a microtome or cryotome.

8. The method as in claim 1, further comprising:
   capturing, by the imaging device, the one or more color images and the one or more fluorescence images of the portion of organic tissue.

9. The method as in claim 1, wherein the adjusted fluorescence data is provided to the electronic display in combination with a visible light image of the portion of organic tissue.

10. An imaging device comprising:
    an interface to provide display data to an electronic display;
    a processor configured to execute one or more processes; and
    a memory configured to store a process executable by the processor, the process when executed configured to:
       determine color information for a portion of organic tissue from one or more captured color images of the organic tissue;
       identify one or more optical properties of the portion of organic tissue using the determined color information and a color lookup table that relates one or more colors with one or more respective types of organic tissues wherein the determined color information is associated with the one or more optical properties in the color lookup table;
       adjust, based on the one or more optical properties in the color lookup table, fluorescence data captured via one or more fluorescence images of the portion of organic tissue to correct one or more artifacts in the one or more fluorescence images; and
       provide the adjusted fluorescence data to an electronic display for display.

11. The imaging device as in claim 10, wherein the color information comprises captured red, green, and blue (RGB) color information from the one or more captured color images.

12. The imaging device as in claim 10, wherein the fluorescence data indicates the presence of a fluorescent dye present in the portion of organic tissue.

13. The imaging device as in claim 10, wherein the organic tissue is associated with the determined color information in the color lookup table.

14. The imaging device as in claim 10, wherein the one or more optical properties of the portion of organic tissue comprise at least one of: scatter, absorption, or anisotropy.

15. The imaging device as in claim 10, wherein the association of the determined color information with the one or more optical properties in the color lookup table is generated by a machine learning-based process.

16. The imaging device as in claim 10, wherein the one or more color images and the one or more fluorescence images are captured while the portion of organic tissue is mounted by a microtome or cryotome.

17. The imaging device as in claim 10, wherein the process when executed is further configured to:
   capture the one or more color images and the one or more fluorescence images of the portion of organic tissue.

18. The imaging device as in claim 10, wherein the adjusted fluorescence data is provided to the electronic display in combination with a visible light image of the portion of organic tissue.

19. A tangible, non-transitory, computer-readable medium storing program instructions that cause an imaging device to execute a process comprising:
   determining, by the imaging device, color information for a portion of organic tissue from one or more captured color images of the organic tissue;
   identifying, by the imaging device, one or more optical properties of the portion of organic tissue using the determined color information and a color lookup table that relates one or more colors with one or more respective types of organic tissues, wherein the determined color information is associated with the one or more optical properties in the color lookup table;
   adjusting, by the imaging device and based on the one or more optical properties in the color lookup table, fluorescence data captured via one or more fluorescence images of the portion of organic tissue to correct one or more artifacts in the one or more florescence images; and
   providing, by the imaging device, the adjusted fluorescence data to an electronic display for display.

20. The computer-readable medium as in claim 19, wherein the color information comprises captured red, green, and blue (RGB) color information from the one or more captured color images.

* * * * *